(12) United States Patent
Szajnowski

(10) Patent No.: US 7,216,047 B2
(45) Date of Patent: May 8, 2007

(54) TIME-DELAY DISCRIMINATOR

(75) Inventor: Wieslaw Jerzy Szajnowski, Güildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/882,173

(22) Filed: Jul. 2, 2004

(65) Prior Publication Data
US 2005/0033537 A1    Feb. 10, 2005

(30) Foreign Application Priority Data
Jul. 7, 2003    (EP)    ................................. 03254301

(51) Int. Cl.
*G01R 29/02*    (2006.01)
(52) U.S. Cl. .......................... 702/79; 702/69; 368/118; 368/120; 375/354; 375/355; 375/356; 375/357; 375/358
(58) Field of Classification Search ................. 702/69, 702/79; 368/120, 118; 375/354, 355, 356, 375/357, 358
See application file for complete search history.

(56) References Cited

U.S. PATENT DOCUMENTS

| 3,781,884 | A | * | 12/1973 | Horton ........................ 102/214 |
| 3,824,464 | A | * | 7/1974 | Rotier et al. ................. 368/118 |
| 4,097,801 | A | * | 6/1978 | Freeman et al. ............ 368/120 |
| 4,733,402 | A | * | 3/1988 | Monsen ....................... 375/347 |
| 4,734,587 | A | | 3/1988 | Schwarte |
| 4,916,677 | A | * | 4/1990 | Fox ............................. 368/113 |
| 4,999,501 | A | * | 3/1991 | Lacy ........................ 250/385.1 |
| 5,150,337 | A | * | 9/1992 | Inbar .......................... 368/118 |
| 5,353,011 | A | * | 10/1994 | Wheeler et al. .......... 340/572.4 |
| 5,671,221 | A | * | 9/1997 | Yang .......................... 370/320 |
| 5,781,845 | A | * | 7/1998 | Dybdal et al. ................ 455/65 |
| 5,841,140 | A | * | 11/1998 | Mc Croskey et al. ... 250/363.03 |
| 6,539,320 | B1 | * | 3/2003 | Szajnowski et al. .......... 702/79 |
| 6,665,308 | B1 | * | 12/2003 | Rakib et al. ................. 370/441 |
| 6,810,087 | B2 | * | 10/2004 | Hoctor et al. ............... 375/259 |
| 2003/0198308 | A1 | * | 10/2003 | Hoctor et al. ............... 375/354 |

FOREIGN PATENT DOCUMENTS

GB      2345149 A   *   6/2000
WO      WO 00/39643 A       7/2000

* cited by examiner

*Primary Examiner*—Carol S. W. Tsai
(74) *Attorney, Agent, or Firm*—Birch, Stewart, Kolasch & Birch, LLP

(57) ABSTRACT

A method of determining the delay between two corresponding noise-like signals comprises determining events at which the level of a first of the signal crosses a predetermined threshold, using each event to sample a second signal, combining the samples to produce an output value and determining the delay from the output value. Preferably, each sample is weighted according to one or more characteristics of the event used to define the sample. The magnitude of the output value could be an indication of the delay, or there could be several output values each for a respective differently-delayed version of the second signal, in which case these could be evaluated to select which corresponds to the actual delay.

14 Claims, 7 Drawing Sheets

TIME-DELAY DISCRIMINATOR

FIELD OF THE INVENTION

This invention relates to a method and apparatus for determining the time delay between at least two signals, for example wideband irregular noise-like signals, and is particularly but not exclusively applicable to a feedback control system employing a time-delay discriminator to provide a corrective signal used by the system to influence the operation of a respective actuator.

BACKGROUND OF THE INVENTION

In a wide range of industrial control systems, the value of a parameter of interest is maintained within a specified interval by first determining the transit time required for some phenomenon or process to travel a predetermined distance.

One example is shown in FIG. 1, which depicts a block diagram of a feedback system employed to control the flow rate of some substance or medium, such as pulverised coal or cooling fluid. The system comprises two suitable non-invasive sensors SX and SY, placed outside the flow pipe FP, a time-delay discriminator TDD, a control unit CON, and a suitable actuator ACT, such as a signal-controlled valve or pump.

In the case of pulverised coal, the sensors may, for example, detect time-varying changes in the electric charge carried by moving coal particles. In the case of determining the flow rate of coolant in, for example, a pressurised water reactor, the sensors will usually detect a γ-ray emitting element carried by the fluid. In either case, the sensors are responsive to an observed physical phenomenon varying in time in a noise-like fashion, and signals produced by the sensors are representations of that phenomenon.

The time-delay discriminator TDD processes two signals, x(t) and y(t), supplied by the sensors and determines the time delay (the transit time) $\Delta$ between those signals. Because the distance D between the sensors SX and SY is known, the required flow rate FR corresponds to some nominal value $\Delta_0$ of transit time, where $\Delta_0$=D/FR. The time-delay discriminator TDD provides at its output the value of a time-delay error $\epsilon=(\Delta-\Delta_0)$, indicative of the discrepancy between the observed and the required flow rates.

The value of error $\epsilon$ provided by the time-delay discriminator TDD is then converted by the control unit CON into a suitable corrective signal applied to the actuator ACT. The main function of the actuator ACT is to adjust the actual flow rate in such a way as to nullify (or at least significantly reduce) the time-delay error $\epsilon$, thereby attaining the required flow rate FR.

FIG. 2 shows an example of another feedback control system employed by an industrial robot ROB whose main function is to follow ('shadow') a moving vehicle MOV, while maintaining a specified 'safe' distance D. A similar control system can be used in automotive applications, for example, in collision-avoidance, cruise control or pre-crash vehicle conditioning.

The system comprises a transmitter TX driving a transmit element TE, a receive element RE coupled to a signal receiver RX, a transmit sensor SX, a receive sensor SY, a time-delay discriminator TDD, a control unit CON, and a drive control block ACT.

A wideband noise or chaotic signal generated by the transmitter TX is sent via the transmit element TE toward the preceding vehicle. The time-delay discriminator TDD processes jointly two signals: a copy of the transmitted signal x(t), captured by the transmit sensor SX, and a signal y(t) reflected back by the vehicle and applied to the receive sensor SY. The time-delay discriminator TDD determines the time delay $\Delta$ between the signals x(t) and y(t). Because the propagation velocity v of the transmitted and received signals is assumed to be known, the specified distance D will be maintained, if the observed delay time $\Delta$ is equal to its nominal value $\Delta_0$=2D/v.

Accordingly, the time-delay discriminator TDD provides at its output the value of a time-delay error $\epsilon=(\Delta-\Delta_0)$, which is converted by the control unit CON into a corrective signal. This signal is then used by the drive control block ACT to adjust the robot's speed in such a way as to nullify (or at least significantly reduce) the time-delay error $\epsilon$, thereby maintaining the required distance D.

The above two examples of applications involving a time-delay discriminator represent two classes of systems incorporating a delay-locked loop, described extensively in the prior art. In such systems, either the velocity or distance is being adjusted, while the other complementary parameter (distance or velocity) is constant, be it by its nature or by design.

In the prior art, systems employing a time-delay discriminator are also classified as being either passive or active, depending on whether the physical phenomenon detectable by sensors is inherent in the observed process, or is imparted (or at least enhanced) by the use of some auxiliary means, such as suitable markers influencing (or 'modulating') the process, ultrasonic or radio-frequency radiators, visible light or infrared illuminators, etc.

If x(t) denotes one of the two signals applied to the time-delay discriminator TDD, the other signal y(t) can be expressed as $$y(t)=Ax(t-\Delta)+n(t)$$

where A is a scale factor, $\Delta$ denotes an unknown time delay and n(t) represents background noise and other interference.

In some practical applications, even in a no-noise case, the signal y(t) will no longer be a scaled and time-shifted replica of the signal x(t), due to flow turbulence, Doppler effect and/or nonlinear sensor characteristics. In such cases, it is assumed that the additive noise waveform n(t) will also include a component representing the respective distortions of the signal shape.

A conventional technique used to determine the value of unknown time delay $\Delta$ is based on crosscorrelating the two wideband signals x(t) and y(t), i.e. by performing the operation $$R_{xy}(\tau) = \frac{1}{T}\int_0^T x(t-\tau)y(t)\,dt$$

where the integral is evaluated over the observation interval of duration T and for a range, $\Delta_{min}<\tau<\Delta_{max}$, of delay values of interest. The value of argument $\tau$ that maximises the crosscorrelation function $R_{xy}(\tau)$ provides an estimate of an unknown delay $\Delta$.

In practice, prior to crosscorrelation, the signals x(t) and y(t) may be suitably prefiltered to accentuate frequencies for which the signal-to-noise ratio (SNR) is highest and to attenuate background noise, thus increasing the resulting overall SNR. A crosscorrelator utilizing signal prefiltering is known in the prior art as a generalized crosscorrelator.

The crosscorrelation process, including prefiltering, can also be implemented digitally, if sufficient sampling and quantising of the signal is used.

FIG. 3 is a block diagram of a conventional system crosscorrelating a received signal y(t) with a reference signal x(t) to determine the value of the unknown delay, and FIG. 4 shows an example of a crosscorrelation function $R_{xy}(\tau)$ between a signal x(t) and its replica y(t) delayed by $\Delta$. In this case, the resulting crosscorrelation function $R_{xy}(\tau)$ is the same as a time-shifted autocorrelation function $R_{xx}(\tau)$ of the signal x(t). Because of the symmetry of $R_{xy}(\tau)$ with respect to its maximum occurring at $\tau=\Delta$, a single value of the cross-correlation function can only provide information about the absolute value $|\Delta-\Delta_0|$ of time-delay error. Therefore, when a correlator is to be used in a time-delay discriminator, some additional operations will have to be performed in order to obtain a bipolar output related to the time-delay error $(\Delta-\Delta_0)$.

For a finite time interval T, the crosscorrelation curve determined experimentally will usually contain errors associated with random fluctuations in the signals themselves, as well as errors due to noise and interference. As a result, the task of locating the crosscorrelation peak is rather difficult to perform in practical systems. Even when the peak is well defined, its position is usually found by evaluating the crosscorrelation function at several points and calculating corresponding differences to approximate the derivative of the crosscorrelation function. Those additional operations are computationally intensive and inconvenient, especially when the peak-seeking procedure is to be implemented for wideband signals in real time.

It is known that the derivative $R'_{xy}(\tau)=dR_{xy}(\tau)/d\tau$ of a crosscorrelation function $R_{xy}(\tau)$ can be obtained by crosscorrelating a first signal with the derivative of a second signal. Because the derivative of a crosscorrelation function is an odd function, i.e. $R'_{xy}(-\tau)=-R'_{xy}(\tau)$, it can provide information about the time-delay error. In some crosscorrelator systems, a similar result is achieved by replacing signal differentiation by Hilbert transformation.

Irrespective of the approach, when there is no noise, and the observation time is sufficiently long, the resulting bipolar curve will cross a zero level exactly at the time instant $\tau$ equal to the time delay $\Delta$ between two signals being processed. FIG. 5 shows an example of a curve observed at the output of a suitably modified crosscorrelator system processing jointly a signal x(t) and its replica y(t) delayed by $\Delta$. Because of the characteristic bipolar S-shape of the curve, such a system can perform the function of a time-delay discriminator required in a delay-locked loop intended to track a time-varying delay of interest.

In general, wideband signals encountered in practical applications are nonstationary with evidently non-Gaussian statistical characteristics. Therefore, many known crosscorrelation techniques based, explicitly or implicitly, on the assumptions of signal stationarity and Gaussianity are only of limited practical use. Furthermore, most practical implementations have to deal with discrete-time samples, so that the optimisation procedures and performance analyses carried out in the continuous-time framework cannot be fully applicable.

WO-A-00/39643 discloses an improved method for the estimation of the time delay between signals using a technique referred to herein as "crosslation". The contents of WO-A-00/39643 are incorporated herein by reference.

The term "crosslation" as used herein refers to a technique whereby predefined (preferably at least substantially aperiodic) events which occur in one signal are used to define staggered segments of a second signal, and representations of the staggered segments are then combined. The first and second signals may in fact be the same signal, in which case the resulting combined representation will provide information regarding the statistical properties of that signal, and in particular about the average behaviour of the signal before and after the predefined events. Alternatively, the first and second signals may be different signals ("mutual crosslation"), or one signal may be a delayed version of the other, in which case the combined representation will provide information about the relationship between those signals. For example, if the combined representation contains a feature which would be expected from combining segments associated with multiple predefined events, this may indicate that one of the signals is delayed with respect to the other by an amount corresponding to the position within the representation of that feature.

According to WO-A-00/39643, a bipolar signal is subjected to an unknown delay, and the reference (non-delayed) version of the signal is examined to determine the time instants at which its level crosses zero with a positive slope (an upcrossing). The timing of these crossing events is used to obtain respective segments of the delayed signal, the segments having a predetermined duration. The segments are all summed, and a representation of the summed segments is then examined to locate a feature in the form of an S-shaped odd function. The position within the representation of a zero-crossing in the centre of the odd function represents the amount by which the signal has been delayed. Instead of using upcrossings, the reference (non-delayed) version of the signal could be examined to determine when its level crosses zero with a negative slope (downcrossings).

WO-A-00/39643 also suggests improving accuracy by using both upcrossings and downcrossings. In this case, the odd S-shaped function to be examined is obtained by summing segments defined by upcrossings and subtracting those defined by downcrossings.

The crosslation techniques of WO-A-00/39643 are robust and particularly well suited for processing non-Gaussian signals corrupted by non-Gaussian noise. Because only timing instants are extracted from one of the signals, time delay estimators based on crosslation are much less sensitive to nonlinear signal distortions than the many conventional estimators. However, the performance of the crosslation technique in its disclosed form can be degraded in applications involving strongly non-stationary intermittent signals with prominent bursts followed by signal fading.

Accordingly, it would be desirable to provide an improved technique for time delay measurement, for example, for use in a feedback control system incorporating a time-delay discriminator.

DESCRIPTION OF THE INVENTION

Aspects of the present invention are set out in the accompanying claims.

In a further aspect of the invention, the delay between two corresponding signals is estimated. Each signal contains a stream of events, which may be defined by the times at which the signal crosses a predetermined threshold. The events of a first one of the signals are used to sample the second signal. The samples are combined, e.g. by summing or averaging (herein references to summing are intended to cover averaging also). The resulting value will depend upon whether the samples are, generally, close to the events in the second signal. If the samples tend substantially to coincide with the events, the value will correspond to a predetermined value (e.g. zero).

In accordance with a particular feature of the present invention, delays which are relatively short compared with the average interval between events can be determined from the value obtained by combining the individual samples. By suitable definition of the events, if the samples tend to be close to but not coincidental with the events, the value will be dependent on the average proximity to the events, and on whether the samples precede or follow the events. This aspect is of particular value in feedback control systems for measuring small timing errors.

Alternatively, delays which are relatively long compared with the average interval between events can be measured using the techniques of WO-A-00/39643. In this technique, as indicated earlier, each event in the first signal is used to take a succession of samples (i.e. a segment) of the second signal. The segments are combined, and the resultant waveform contains a feature having a position corresponding to the delay.

In accordance with a further, independent aspect of the invention, the samples of the second signal are weighted in accordance with one or more characteristics of the events (in the first signal) which define them, before being combined. This aspect can be used in either of the two techniques mentioned above, i.e. when measuring either relatively short or relatively long delays. It is of particular advantage in situations involving signals which are intermittent and/or have widely varying amplitudes, because it enables the samples defined by those events associated with stronger parts of the signal to have a greater influence on the resulting output than other samples, thereby improving performance.

Typical characteristics associated with the events are the slope of the first signal when the event occurs, and the average amplitude of the first signal in the vicinity of the event (for example in the period just before and just after the event, or in the period between that event and the next event). Either or both of these characteristics could be used to calculate a weight for applying to the samples.

DESCRIPTION OF THE DRAWINGS

Arrangements embodying the present invention will be described by way of example with reference to the accompanying drawings, in which.

DETAILED DESCRIPTION OF PREFERRED EMBODIMENTS

In the preferred embodiments to be described, it is assumed that two signals are available for processing: a wideband noise-like reference signal x(t) and a received signal y(t) which is a time-delayed replica of x(t). Furthermore, the received signal y(t) may have been corrupted by noise and other interference.

A reference signal x(t) is examined to construct two streams of events:

1. a first stream, obtained from zero upcrossings, comprising the time instants $$\{t_k; k=1, 2, \ldots, K\}$$

at which the signal crosses zero with a positive slope (an upslope);

2. a second stream, obtained from zero downcrossings, comprising the instants $$\{t_m; m=1, 2, \ldots, M\}$$

at which the signal crosses zero with a negative slope (a downslope).

Figure 6:
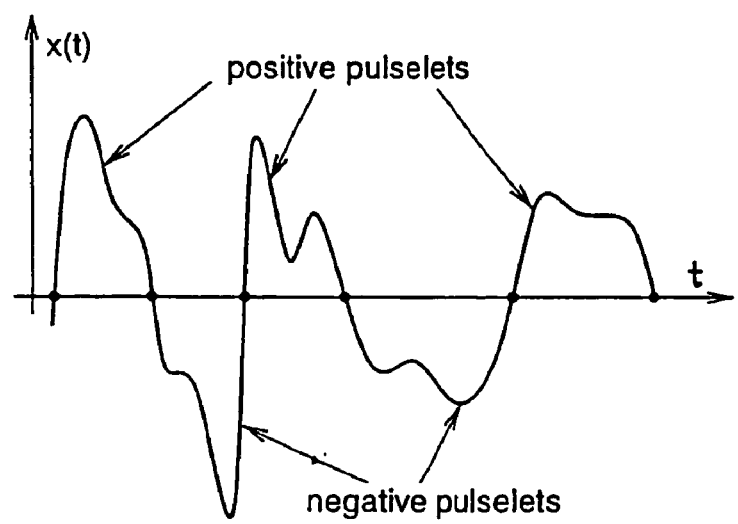
FIG. 6 depicts a segment of a continuous irregular signal consisting of contiguous, alternating positive and negative pulselets, punctuated by respective zero crossings.

A fragment of a signal starting at any zero crossing and ending at the next zero crossing will be referred to as a pulselet. Therefore, a segment of a continuous signal can be viewed as consisting of contiguous, alternating positive and negative pulselets, punctuated by respective zero crossings, as illustrated in FIG. 6.

At each zero upcrossing instant $t_k$, values of two parameters of a respective positive pulselet $p^+_k(t)$ are determined: the upslope $S^+_k$, defined by $$S_k^+ = \frac{\partial}{\partial t} p_k^+(t) \bigg|_{t=t_k}$$

and the mean level $V^+_k$, determined from $$V_k^+ = \sqrt{\frac{1}{t_j - t_k} \int_{t_k}^{t_j} |p_k^+(t)|^2 dt}$$

where $t_j$ is a zero-downcrossing instant following a zero-upcrossing at $t_k$; in this case, the mean level is defined as the root-mean-square (RMS) value of the positive pulselet.

Alternatively, the mean level $V_k^+$ can be determined from $$V_k^+ = \frac{1}{t_j - t_k} \int_{t_k}^{t_j} p_k^+(t) dt$$

In this case, the mean level equals the mean value of the positive pulselet.

Figure 7:
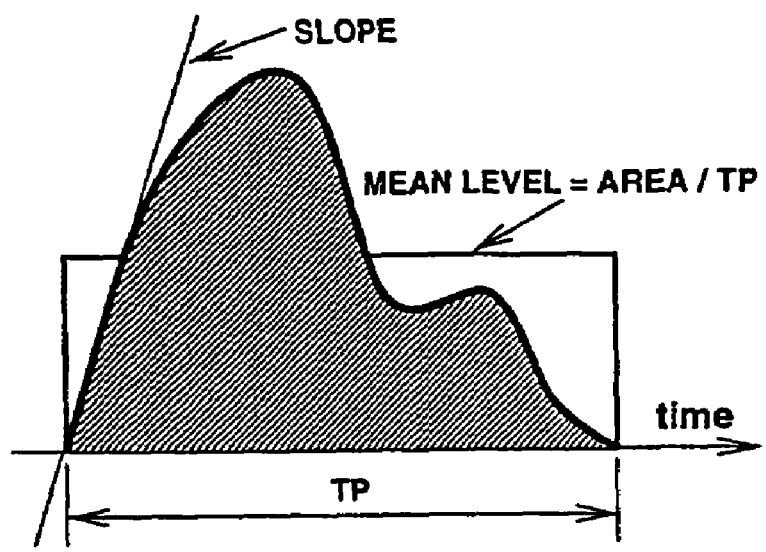
FIG. 7 illustrates schematically a positive pulselet, its upslope and its mean level, defined as the mean value of the pulselet.

FIG. 7 illustrates schematically a positive pulselet $p_k^+(t)$, its upslope $S_k^+$ and its mean level $V_k^+$, defined as the mean value of the pulselet.

In a similar manner, the downslope $S_m^-$ and the mean level $V_m^-$ are determined for each negative pulselet $p_k^-(t)$, following a zero downcrossing at $t_m$. The values of those parameters are calculated from $$S_m^- = -\frac{\partial}{\partial t} p_m^-(t) \Big|_{t=t_m}$$

(hence, by definition, the downslope may assume positive values only), and $$V_m^- = \sqrt{\frac{1}{t_i - t_m} \int_{t_m}^{t_i} |p_m^-(t)|^2 dt}$$

where $t_i$ is a zero-upcrossing instant following a zero-downcrossing at $t_m$; in this case, the mean level is defined as the root-mean-square (RMS) value of the negative pulselet. Alternatively, $$V_m^- = \frac{1}{t_i - t_m} \int_{t_m}^{t_i} |p_m^-(t)| dt$$

In this case, the mean level equals the mean absolute value of the negative pulselet.

For each zero upcrossing $t_k$, the upslope $S_k^+$ and the mean level $V_k^+$ of a respective positive pulselet are suitably combined to produce a weight (or mark) $W_k^+$ associated with that upcrossing event. Consequently, individual events occurring in the resulting stream of events will have different weights assigned to them.

In a similar manner, for each zero downcrossing $t_m$, the downslope $S_m^-$ and the mean level $V_m^-$ of a respective negative pulselet are used to produce a weight (or mark) $W_m^-$ associated with that downcrossing event. Also in this case, the events within the stream will have different weights assigned to each of them.

Figure 8:
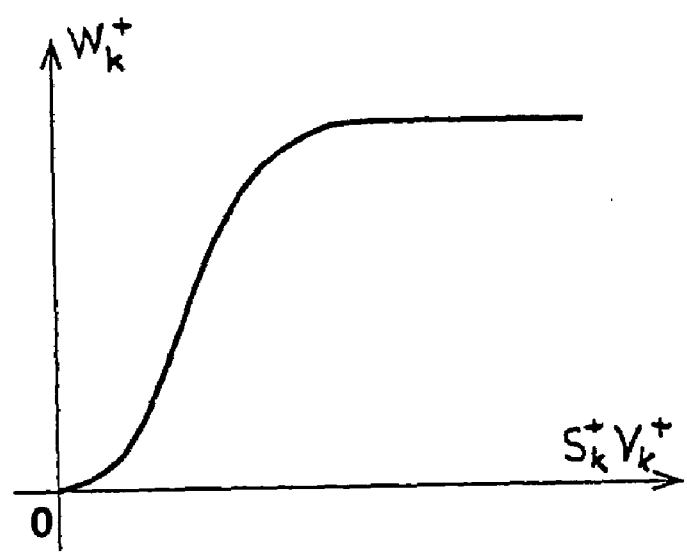
FIG. 8 shows an example of a nonlinear transformation of the product used to obtain weights to be assigned to zero-crossing events.

It is reasonable to assume that higher-level signals are less likely to be severely corrupted by noise and other interfering effects; also, zero-crossing locations are less likely to be significantly perturbed, if they are associated with steeper slopes leading to larger signal extrema. Therefore, a weight assigned to a zero-crossing event should be increased, if the corresponding pulselet has a steeper slope and a larger mean level. For example, a weight can be made proportional to the product of those two parameters, or it may be a representation of a suitable nonlinear function of the product. FIG. 8 shows an example of a nonlinear transformation of the product used to obtain weights to be assigned to zero-crossing events.

Figure 9:
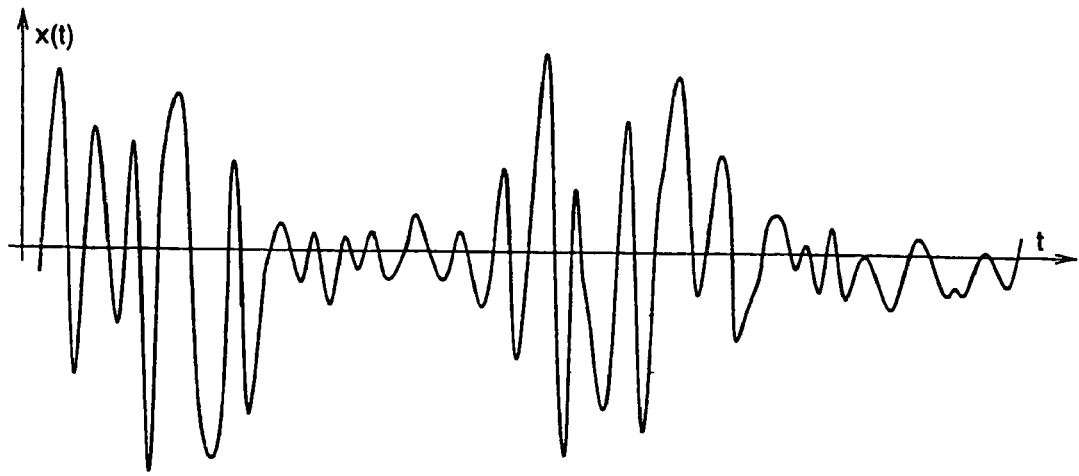
FIG. 9 depicts a fragment of a nonstationary irregular signal comprising alternating burst-and-fade intervals.

The operation of assigning different weights to zero-crossing events is particularly advantageous in applications involving strongly non-stationary noise-like signals with prominent bursts followed by signal fading. For illustrative purposes, FIG. 9 depicts a fragment of a nonstationary irregular signal comprising alternating burst-and-fade intervals. It is evident that steeper slopes combined with higher mean signal levels can be more resistant to noise and other interference.

Samples of a received signal y(t) are taken at the time instants coincident with 'marked' zero-crossing events determined from the reference signal x(t). Preferably, both streams of events (upcrossings and downcrossings) are utilized; however, either one of the two streams alone can alternatively be employed. Next, such derived samples of the received signal y(t) are multiplied by the respective weights assigned to zero-crossing events defining sampling time instants.

Samples of y(t), taken at upcrossing time instants $\{t_k; k=1, 2, \ldots, K\}$, and the associated weights $W_k^+$ are used to determine K products of the form $$\{[W_k^+ y(t_k)]; k=1, 2, \ldots, K\}$$

Similarly, samples of y(t), taken at downcrossing time instants $\{t_m; m=1, 2, \ldots, M\}$, and the associated weights $W_k^-$ are used to determine M negative products of the form $$\{[-W_k^- y(t_m)]; m=1, 2, \ldots, M\}$$

Next, the two sets of products are added together to produce a weighted sum WS of the samples derived from the received signal y(t), hence $$WS = \sum_{k=1}^{K} W_k^+ y(t_k) + \sum_{m=1}^{M} W_m^- y(t_m)$$

Figure 1:
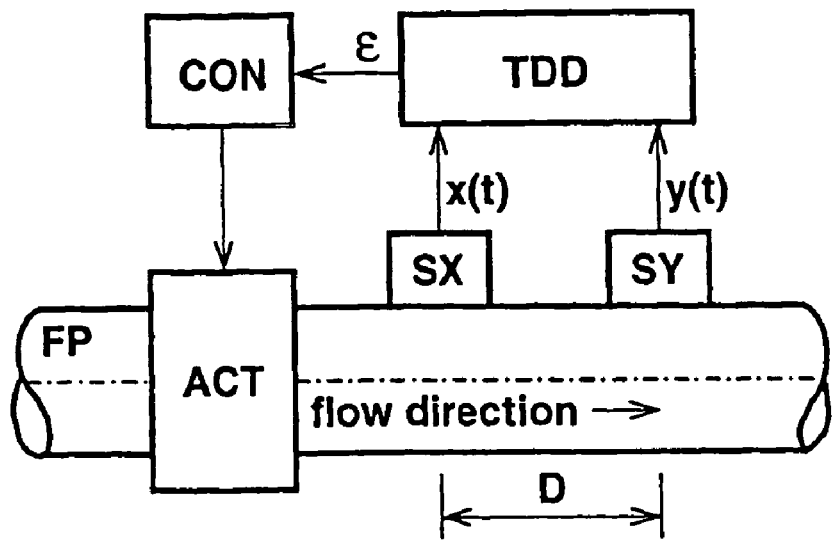
FIG. 1 is a block diagram of a feedback system employed to control the flow rate of some substance or medium, such as pulverised coal or cooling fluid.
Figure 2:
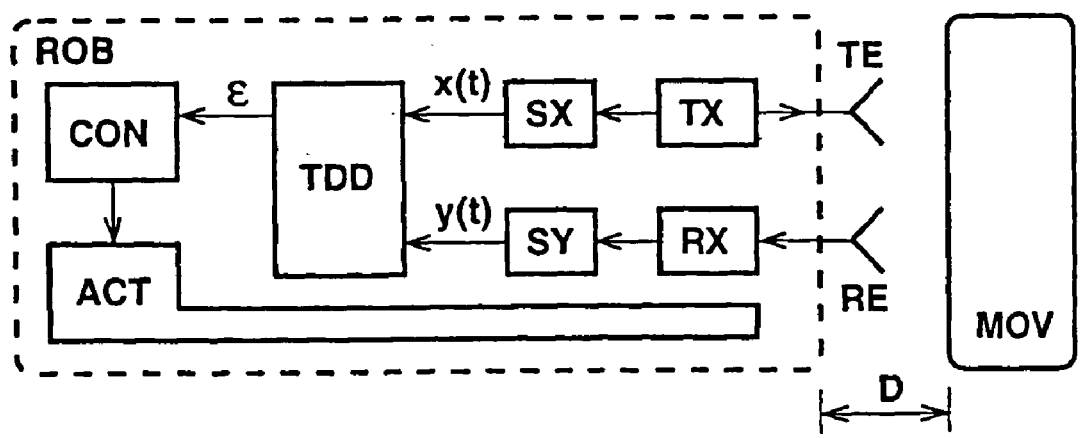
FIG. 2 shows an example of a control system employed by a robot whose function is to follow a moving vehicle, while maintaining a specified distance.
Figure 3:
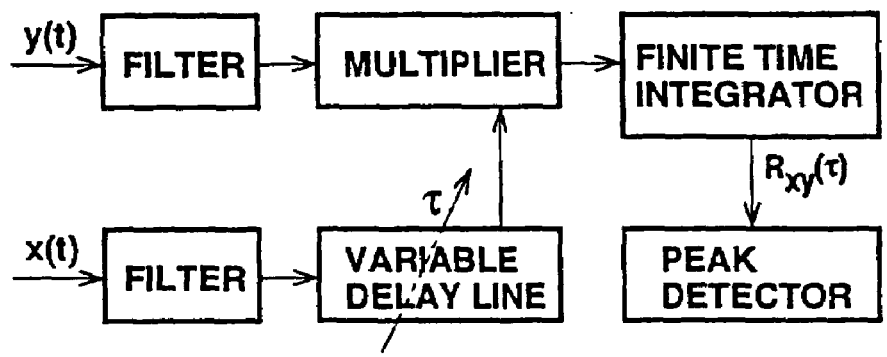
FIG. 3 is a block diagram of a conventional system crosscorrelating a delayed signal y(t) with a reference signal x(t) to determine the value of unknown delay.
Figure 4:
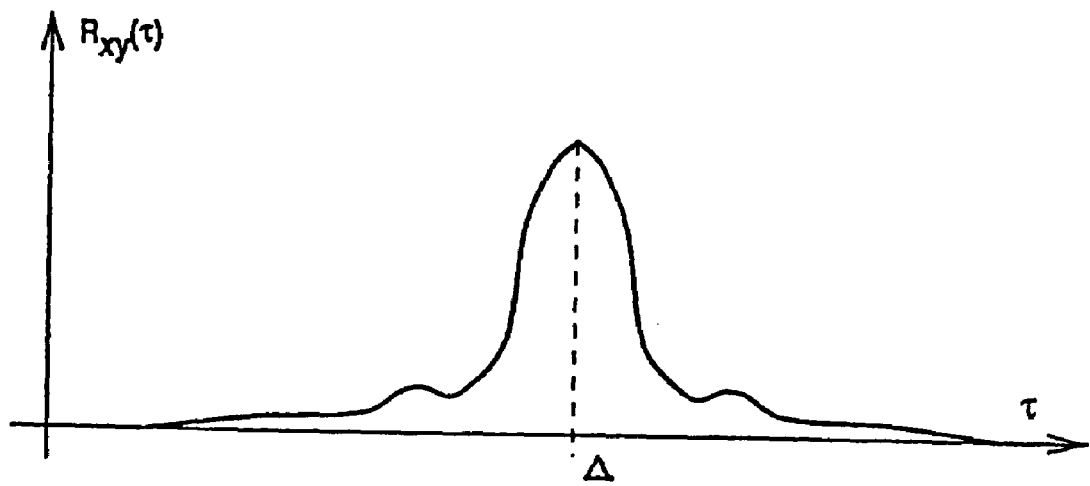
FIG. 4 is an example of the shape of a crosscorrelation function $R_{xy}(\tau)$ between a signal x(t) and its replica y(t) delayed by $\Delta$.
Figure 5:
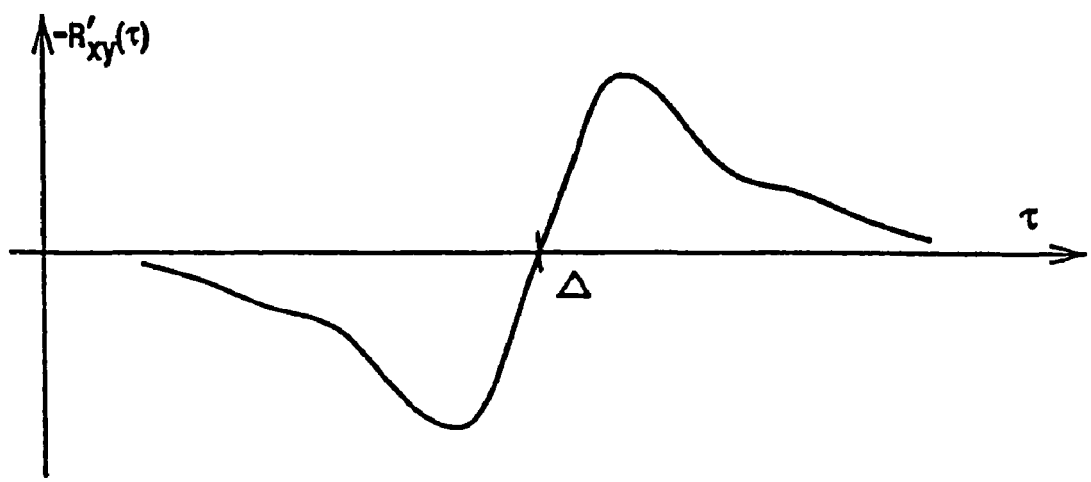
FIG. 5 is an example of a curve observed at the output of a modified cross-correlator system processing jointly a signal x(t) and its replica y(t) delayed by $\Delta$.

When there is no delay between a reference signal x(t) and a received signal y(t), the weighted sum WS will be equal to zero. However, when the relative delay is slightly increasing or decreasing, the value of the weighted sum will follow the change as long as the delay deviation (or offset) remains within the central linear region of a delay-discriminator characteristic, similar to that shown in FIG. 5. In such a case, the absolute value of the weighted sum WS will be proportional to the magnitude of the delay deviation, whereas the sign of the weighted sum WS will indicate the direction (polarity) of the delay deviation.

Figure 10:
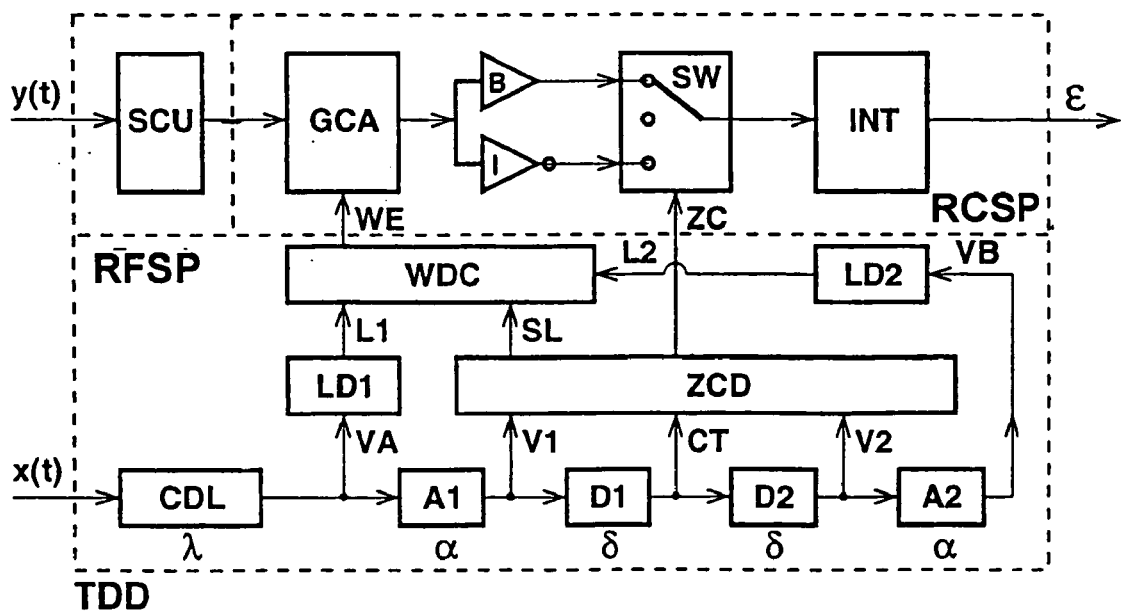
FIG. 10 is a block diagram of a time-delay discriminator arranged to operate in accordance with the present invention.

FIG. 10 is a block diagram of a time-delay discriminator arranged to operate in accordance with the present invention. The discriminator TDD comprises a reference signal processor RFSP comprising five delay circuits: a constant delay line CDL with delay λ, two delay circuits, A1 and A2, each with delay α, and two further delay circuits, D1 and D2, each with delay δ. The reference signal processor RFSP also comprises a zero-crossing detector ZCD, two level detectors, LD1 and LD2, and a weight-determining circuit WDC.

The discriminator TDD further comprises a signal conditioning unit SCU and a received signal processor RCSP comprising a gain-controlled amplifier GCA, a buffer B and an inverter I, a switch SW, and an integrator INT.

In the reference signal processor RFSP, a reference signal x(t) is applied to cascaded delay circuits, CDL, A1, D1, D2 and A2, with different delays. Functionally, this arrangement is equivalent to a single delay line with five taps: VA, V1, CT, V2 and VB. The total delay, equal to $(\lambda+\alpha+\delta)$, between the delay-line input and the central tap CT is approximately equal to the nominal delay between the signal x(t) and y(t). The zero-crossing detector ZCD is operable to detect a zero-crossing instant at tap CT. As described below, each time a zero-crossing is detected, the reference signal processor RFSP provides a signal representing the time of the zero-crossing and its type (up or down) to an input ZC of the received signal processor RCSP, and a weight signal to an input WE of the received signal processor RCSP.

A received signal y(t) is first pre-processed in the signal conditioning unit SCU, which comprises a suitable low-pass filter, such as a Gaussian filter or a Bessel filter. Prior to low-pass filtering, the dynamic range of the signal may be reduced in a hard-limiter or a soft-limiter.

Next, the output signal of the signal conditioning unit SCU is applied to the received signal processor RCSP, where it is amplified by the gain-controlled amplifier GCA by a factor proportional to a respective weight, supplied to input WE by the reference signal processor RFSP. Such modified signal is then applied simultaneously to a buffer B and an inverter I, which reverses the signal polarity.

When a zero-upcrossing event has been detected in the reference signal x(t) as indicated by the signal received at input ZC, the switch SW samples the output of the buffer B. However, when a zero-downcrossing event has been detected in the signal x(t), the switch SW samples the output of the inverter I.

During the time between zero-crossing events, the switch SW remains in a 'neutral' position. Samples extracted by the switch SW are passed to an integrator INT, which may be of a 'running-average' type, or 'integrate-and-dump' type. A signal $\epsilon$ proportional to the relative delay between the received signal y(t) and the delayed signal x(t), observed at tap CT, is available at the output of the integrator.

When a zero-crossing instant is detected at tap CT by the zero-crossing detector ZCD, the type of the crossing and its slope are determined from the signals observed at outputs V1 and V2 of the delay circuits A1 and D2, respectively. While the signal at tap V1 is advanced by a small amount $\delta$ with respect to the signal observed at central tap CT, the signal at tap V2 is retarded by the same amount $\delta$ with respect to the central-tap signal. Therefore, the difference between signals observed at taps V1 and V2 approximates the derivative of the signal in the vicinity of a zero-crossing detected at tap CT.

In the case of a zero upcrossing occurring at instant $t_k$, the difference between the signals at taps V1 and V2 can be expressed as $$|x(t_k+\delta)-x(t_k-\delta)|\approx 2\delta S^+_k$$

Similarly, in the case of a zero downcrossing occurring at instant $t_m$, this difference is $$|x(t_m+\delta)-x(t_m-\delta)|\approx 2\delta S^-_k$$

The absolute value of the difference, being a practical measure of the pulselet slope, is applied to input SL of the weight-determining circuit WDC.

If CT=0 and V1>V2, a zero-upcrossing event has been detected at CT; however, if CT=0 and V2>V1, the detected event is a zero downcrossing. The zero-crossing detector ZCD produces a pulse coincident with the zero-crossing time instant, and the pulse polarity indicates the type of that zero crossing (i.e. an upcrossing or a downcrossing). The resulting bipolar pulse train generated by the detector ZCD is applied to input ZC of the switch SW in the received signal processor RCSP.

The mean level corresponding to a detected zero crossing is estimated by the weight-determining circuit WDC from two values L1 and L2 provided by level detectors LD1 and LD2, respectively. The detectors determine running meanabsolute (or mean-square) values L1 and L2 of signals observed at taps VA and VB, respectively. While the signal at tap VA is advanced in time by the amount of $(\alpha+\delta)$ with respect to the signal observed at central tap CT, the signal at tap VB is retarded by the same amount $(\alpha+\delta)$ with respect to the signal at CT. The value of the total delay, $2(\alpha+\delta)$, between taps VA and VB is related to the predicted average interval between consecutive zero crossings. Preferably, this delay should be approximately equal to that time interval. Preferably, the arithmetic (or geometric) mean of the current values L1 and L2 is used as a measure of the mean level of a pulselet being observed at tap CT.

(It will be noted that the FIG. 10 arrangement operates slightly different from the mean level measurement described in connection with FIGS. 6 and 7. In the latter case the measurement is based on the waveform in the area between the current event and the next event, whereas in the FIG. 10 arrangement it is based on levels prior to and after the current event. Either technique, or indeed other techniques, could be used.)

Figure 11:
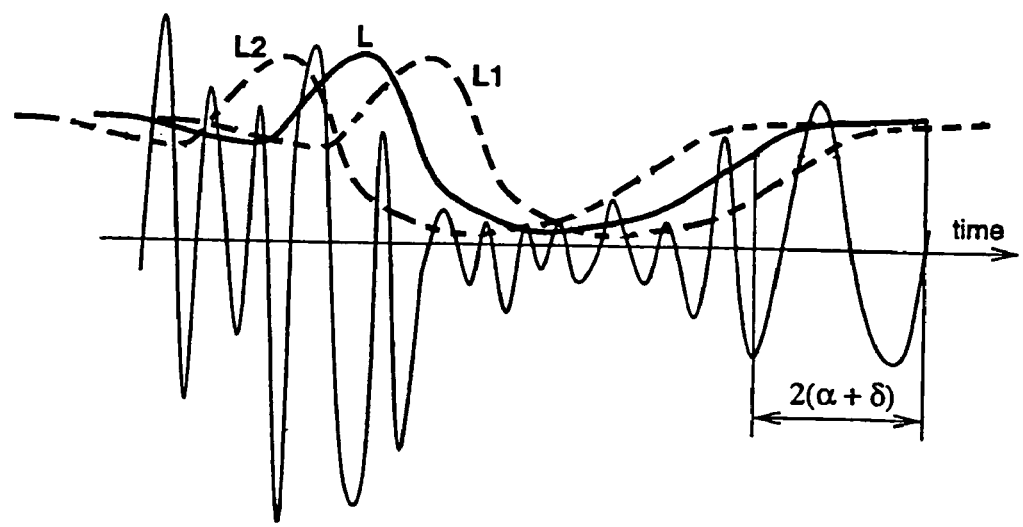
FIG. 11 illustrates schematically the relationship between two running averages of a received signal.

FIG. 11 illustrates schematically the running average L of the signal appearing at tap CT, and the relationship between the advanced running average L1 and the retarded running average L2, delayed with respect to L1 by the time $2(\alpha+\delta)$.

The weight-determining circuit WDC uses the value of the slope SL combined with the values L1 and L2 to determine the weighting factor to be assigned to a zero-crossing event detected at tap CT. Preferably, the weighting factor is non-linearly related to the product of the slope SL and the mean of values L1 and L2. The calculated weight is then applied to input WE of the gain-controlled amplifier GCA in the received signal processor RCSP.

Figure 12:
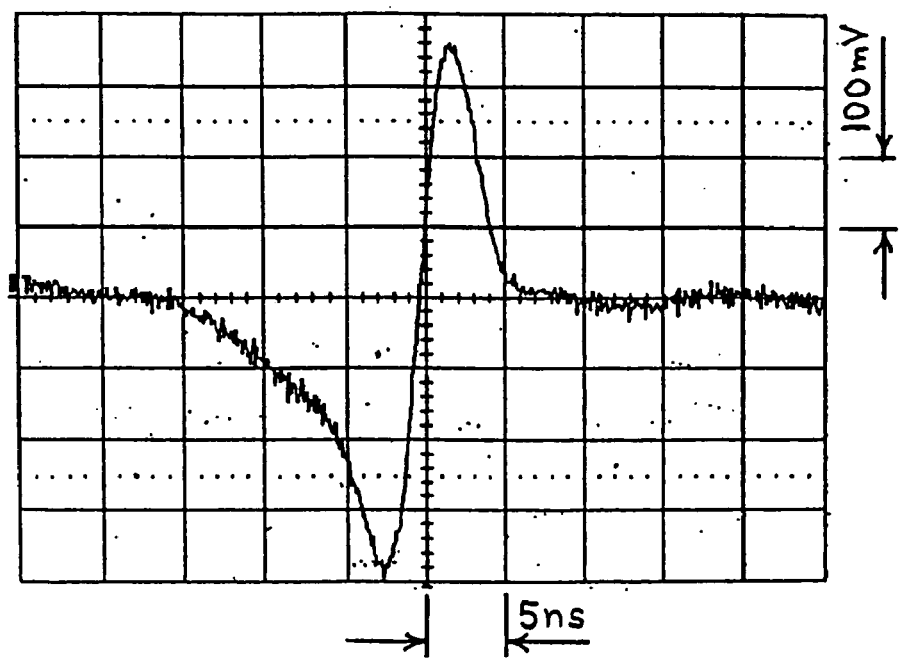
FIG. 12 depicts the experimental characteristics of a time-delay discriminator constructed in accordance with the present invention.

FIG. 12 depicts the experimental characteristic of a time-delay discriminator constructed in accordance with the present invention. The reference signal and its delayed replica, i.e. the received signal, were derived from a wide-band noise source with the bandwidth exceeding 200 MHz. For this experiment, a stream comprising 2048 zero-upcrossing events was used for sampling the received signal.

The horizontal axis in FIG. 12 represents time with respect to the detected zero crossing. The vertical axis represents the voltage obtained by integrating the weighted samples of the received signal. Different delays between the received signal and the reference signal will cause the waveform of FIG. 12 to adopt different horizontal positions. When there is zero delay, the waveform will be centred, such that it intersects the origin of the graph. In the example shown in FIG. 12, the output value $\epsilon$ (i.e. the voltage obtained when sampling occurs at the time of the zero crossing) equals 100 mV, which corresponds to a timeoffset equal to 0.4 ns. In FIG. 12 the slope of the central quasilinear region of the characteristic is equal to 240 mV/ns. The maximum delay to be expected in the system is short, and less than the average interval between zero-crossings. Consequently, the system operates within this quasilinear region.

Figure 13:
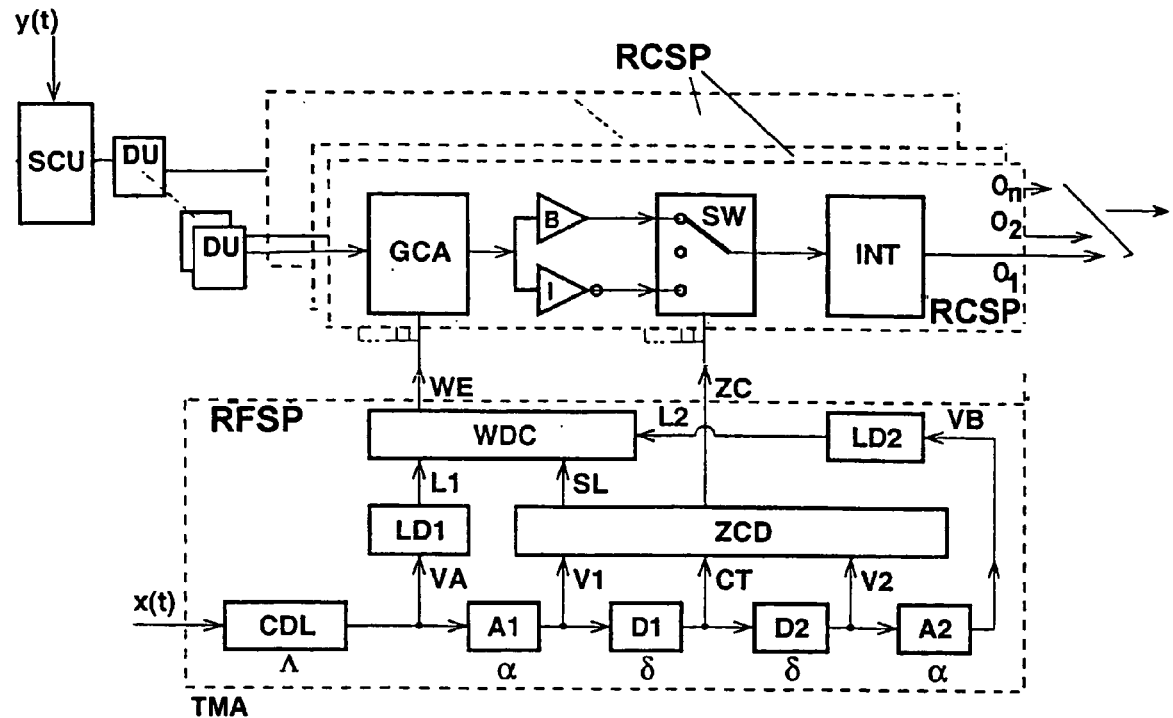
FIG. 13 is a block diagram of a time delay measurement apparatus according to the present invention, which uses a bank of signal processors.

FIG. 13 shows a time measurement apparatus TMA according to the present invention. Similar components to those of the FIG. 10 embodiment are assigned identical reference characters.

The main difference between the embodiments is that, in FIG. 13, there is a bank of multiple received signal processors RCSP, each of which processes a differently-delayed version of the received signal y(t).

Accordingly, the received signal y(t), after being processed by the signal conditioning unit SCU is delivered to a succession of cascaded delay units DU. The output of each delay unit DU is delivered to the next delay unit and to a respective received signal processor RCSP.

Each of the outputs $O_1, O_2, \ldots O_n$ of the received signal processors RCSP adopts a voltage which depends upon the delay imparted to the version of the signal y(t) received at the input of the respective received signal processor RCSP. Collectively, the outputs represent a waveform which may typically have the shape shown in FIG. 14.

If the particular delay imparted to the signal y(t) is such that the zero-crossings detected in the reference signal processor RFSP are not correlated with the zero-crossings of the delayed signal y(t), then the output voltage of the respective received signal processor RCSP will tend to equal the mean value of the signal y(t). Examples of this are shown at $O_1$, $O_2$ and $O_n$ in FIG. 14.

Figure 14:
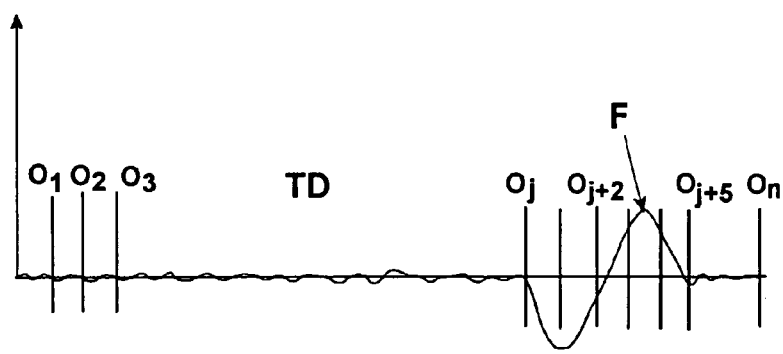
FIG. 14 is a waveform represented by the collective outputs of the apparatus of FIG. 13.

On the other hand, if the delayed version of the signal y(t) is sampled at times which, generally, are in proximity to the zero-crossings of the delayed signal, then the output values will lie on the odd function F shown in FIG. 14, such as for the examples $O_j$ to $O_{j+5}$.

The delay between the signals can be calculated by determining that output value (e.g. $O_{j+2}$) which lies closest to the centre of the odd function, using standard signal-processing techniques. Thus, the delay TD shown in FIG. 14 corresponds to the position of the odd function on the waveform.

This arrangement is useful for applications in which the delay is longer than the average interval between zero-crossings. The delay line CDL could be arranged to impart a relatively long initial delay Λ to the signal x(t), so that the apparatus operates within a time window of interest. Instead of delaying the signal y(t), the signals applied to inputs WE and ZC by the reference signal processor RFSP could be differently delayed for the respective received signal processors RCSP.

In the above embodiments, the signals x(t) and y(t) are bipolar signals with a zero-mean, and zero-crossing events are used for sampling purposes. However, various modifications are possible. The signal does not have to be bipolar. Although it is preferred for the threshold level defining the crossing events to be the average value of the signal, this also is not essential. The threshold used for upcrossings may differ from that used for downcrossings. Indeed, it is not essential to use both upcrossings and downcrossings. In the arrangements described above, the use of the buffer B and the inverter I effectively means that the samples triggered by downcrossings are subtracted from those triggered by upcrossings. Alternative arrangements are possible. For example, in some cases summing of the samples would be appropriate, for example if the threshold levels for the upcrossings and downcrossings are suitably (e.g. evenly) distributed above and below the mean value of the signal.

The desired object is to arrange for the combined samples to produce a distinctive value when the sampling tends to coincide with events in the received signal which correspond to the detected events in the reference signal. Preferably, this value should change monotonically as the delay changes over the delay range of interest. This can most easily be achieved by making the threshold (or thresholds) defining the events substantially different from the extreme values of the reference signal, and preferably close to the average value of the signal. It is even more desirable for the varying values to represent an odd function (by using bipolar signals), so the polarity of the value indicates the direction in which the calculated delay departs from a nominal value.

In situations (e.g. active systems) where the delay is being measured between signals, only one of which has been subjected to possible distortion in a transmission path, it is preferred that the weighting be based on the characteristics of the events in a reference signal which has not been transmitted (e.g. the source signal before transmission), to avoid unnecessary distortion of the weighting.

The present invention is particularly advantageous when used for determining the delay between signals which are of a noise-like character, in which the events occur substantially aperiodically, and particularly where the amplitude varies, for examples signals generated by a random or chaotic process. However, such characteristics are not always necessary. For example, in the embodiment of FIG. 10 it is not essential that the events be spaced aperiodically (although this is desirable to avoid false loop locking).

In the arrangements described above, the weighting function can adopt any one of a number of different values. Alternatively, the function could be arranged to adopt only 0 and unitary values. This is equivalent to deciding whether to use or discard respective events.

Although the presented preferred embodiments have analogue implementations of a time-delay discriminator constructed in accordance with the present invention, all, or some, of the required functions and operations can be performed by suitably configured digital circuitry.

The foregoing description of preferred embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilize the invention in various embodiments suited to the particular use contemplated.

The invention claimed is:

1. A method for determining the delay between two corresponding signals, the method comprising determining events at which the level of a first of the signals crosses a predetermined threshold, using each event to select a part of a second signal from which a sample is derived, determining a weighting factor associated with each event, weighting each sample according to the weighting factor associated with the event defining the sample, and combining the weighted samples to produce an output value and determining the delay from said output value.

2. A method as claimed in claim 1, for determining delays which are smaller than the average interval between events, and wherein the delay is determined from the magnitude of the output value.

3. A method as claimed in claim 1, including the step of deriving multiple output values by sampling mutually-delayed respective versions of the second signal, and determining the delay by determining which output value represents the greatest number of combined events.

4. A method as claimed in any preceding claim, wherein each weighting factor is dependent upon the slope of the first signal at the time of the event.

5. A method as claimed in accordance with claim 1, in which the weighting factor is dependent upon the average level of the first signal in the vicinity of the event.

6. A method as claimed in claim 5, wherein the weighting factor is dependent upon the product of the slope of the first signal at the time of the event and the average level of the first signal in the vicinity of the event.

7. A method as claimed in accordance with claim 1, wherein the weighting factor is related non-linearly to at least one value representing at least one characteristic of the event.

8. A method of determining the delay between two corresponding noise-like signals, the method comprising determining events at which the level of a first of the signal crosses a predetermined threshold, using each event to sample a second signal, combining the samples to produce an output value and determining the delay from the magnitude of the output value; and
   wherein the events are defined by the crossing of one or more predetermined thresholds substantially different from the extreme values of the signal, whereby the output value changes monotonically as the delay changes over a range of interest.

9. A method as claimed in accordance with claim 8, wherein the signals are bipolar.

10. A method as claimed in accordance with claim 8, wherein the events are at least substantially aperiodic.

11. A method as claimed in accordance with claim 8, wherein one of the signals has been transmitted and received via a delay path, and the other signal comprises a reference signal, the method being used to determine the delay associated with the delay path.

12. A method as claimed in claim 11, wherein the reference signal is the first signal.

13. Apparatus for determining the delay between two corresponding signals, the apparatus being arranged to operate according to a method as claimed in accordance with claim 8.

14. A closed-loop feedback system having a device for generating an error signal by determining a delay offset, using a method as claimed in claim 1, and an actuator responsive to the error signal for performing an operation to adjust the offset.

* * * * *